(12) United States Patent
Taniguchi et al.

(10) Patent No.: US 9,664,419 B2
(45) Date of Patent: May 30, 2017

(54) HEAT PUMP DEVICE FOR VEHICLE (71) Applicant: PANASONIC INTELLECTUAL PROPERTY MANAGEMENT CO., LTD., Osaka (JP)

(72) Inventors: Katsuji Taniguchi, Kanagawa (JP);
Satoshi Nakaya, Kanagawa (JP);
Yoshitoshi Noda, Kanagawa (JP);
Tomohiro Terada, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 234 days.

(21) Appl. No.: 14/410,657

(22) PCT Filed: Jun. 26, 2013

(86) PCT No.: PCT/JP2013/004002
§ 371 (c)(1),
(2) Date: Dec. 23, 2014

(87) PCT Pub. No.: WO2014/002496
PCT Pub. Date: Jan. 3, 2014

(65) Prior Publication Data
US 2015/0338134 A1 Nov. 26, 2015

(30) Foreign Application Priority Data

Jun. 29, 2012 (JP) .................................. 2012-147613
Aug. 13, 2012 (JP) .................................. 2012-179285

(51) Int. Cl.
*F25B 13/00* (2006.01)
*F25B 49/02* (2006.01)
(Continued)

(52) U.S. Cl.
CPC ......... *F25B 13/00* (2013.01); *B60H 1/00899* (2013.01); *B60H 1/143* (2013.01);
(Continued)

(58) Field of Classification Search
CPC .. F25B 13/00; F25B 49/022; F25B 2339/047; F25B 2400/071; F25B 2600/025;
(Continued)

(56) References Cited

U.S. PATENT DOCUMENTS 4,273,744 A * 6/1981 Krueger ................... F01P 11/06
165/134.1
5,289,698 A * 3/1994 Garimella .......... B60H 1/00007
62/239

(Continued)

FOREIGN PATENT DOCUMENTS

DE 26 04 942 A1 8/1977
JP 07-266857 A 10/1995
(Continued)

OTHER PUBLICATIONS

International Search Report for Application No. PCT/JP2013/004002 dated Oct. 1, 2013.
(Continued)

*Primary Examiner* — Cassey D Bauer
(74) *Attorney, Agent, or Firm* — Pearne & Gordon, LLP (57) ABSTRACT

A heat pump device for a vehicle capable of effectively utilizing the heat of structural members. This heat pump device for a vehicle comprises: an electric compressor for compressing and discharging refrigerant and a high-temperature water-refrigerant heat exchanger for conducting heat exchange between the high-temperature, high-pressure refrigerant discharged by the electric compressor and a first cooling liquid which is antifreeze, the high-temperature water-refrigerant heat exchanger surrounding and being in (Continued)

contact with the electric compressor so as to be capable of heat exchange with the electric compressor.

10 Claims, 12 Drawing Sheets

(51) Int. Cl.
　　　*F04B 39/06* 　　(2006.01)
　　　*B60H 1/14* 　　(2006.01)
　　　*B60H 1/00* 　　(2006.01)
(52) U.S. Cl.
　　　CPC ............ *F04B 39/06* (2013.01); *F25B 49/022* (2013.01); *B60H 2001/00928* (2013.01); *F25B 2339/047* (2013.01); *F25B 2400/071* (2013.01); *F25B 2600/0253* (2013.01); *F25B 2700/21152* (2013.01)
(58) Field of Classification Search
　　　CPC .... F25B 2600/0253; F25B 2700/21152; F25B 2313/031; F25B 2345/002; F25B 3/00; F25B 3/31006; F25B 31/026; B06H 1/00899; B06H 1/143; B06H 2001/00928; B60H 1/00542; B60H 1/143
　　　See application file for complete search history.

(56) References Cited

U.S. PATENT DOCUMENTS

| | | | |
|---|---|---|---|
| 7,182,129 B2 * | 2/2007 | Karl | B60H 1/00007 165/202 |
| 2007/0209385 A1 * | 9/2007 | Yabu | F24F 3/1411 62/480 |
| 2010/0037648 A1 * | 2/2010 | Kaneko | C10M 169/04 62/468 |
| 2012/0151950 A1 * | 6/2012 | Jagusztyn | F28D 7/1684 62/228.1 |

FOREIGN PATENT DOCUMENTS

| | | | | |
|---|---|---|---|---|
| JP | 3477868 B2 | 12/2003 | | |
| JP | 2005-112247 A | * | 4/2005 | ............... B60H 1/04 |
| JP | 2005-146987 A | * | 6/2005 | ............... F04C 29/00 |
| JP | 2007-064173 A | | 3/2007 | |

OTHER PUBLICATIONS

Kowsky et al., "Unitary HPAC System," SAE International J. Passeng. Cars—Mech. Syst., 2012, doi: 10.4271/2012-01-1050.
Extended European Search Report issued in Application No. EP 13809672 dated May 17, 2016.

* cited by examiner

HEAT PUMP DEVICE FOR VEHICLE

TECHNICAL FIELD

The present invention relates to an in-vehicle heat pump apparatus.

BACKGROUND ART

In-vehicle heat pump apparatuses provided with a heat pump and configured to exchange heat between refrigerant and coolant have been known. Non-Patent Literature (hereinafter, referred to as "NPL") 1 discloses a temperature adjustment system for a vehicle provided with an in-vehicle heat pump air conditioner (HPAC) and configured to perform cooling and heating of the vehicle interior using a coolant extracted by the in-vehicle heat pump apparatus. This in-vehicle heat pump apparatus includes: a compressor that compresses refrigerant; a condenser that performs heat radiation from the refrigerant to the coolant; a cooler that cools the coolant using the refrigerant; a condenser pump that sends out the coolant to the condenser; and a cooler pump that sends out the coolant to the cooler.

Moreover, as a related art of the invention of the subject application, Patent Literature (hereinafter, referred to as "PTL") 1 discloses a refrigerating device in which a tube of a refrigerant water heat exchanger is placed around a compressor with a space between the tube and compressor (see, FIGS. 22 and 24 of PTL 1).

CITATION LIST

Patent Literature

PTL 1
Japanese Patent No. 3477868
Non-Patent Literature
NPL 1
Kowsky et al., "Unitary HPAC System," SAE International J. Passeng. Cars—Mech. Syst., 2012, doi: 10.4271/2012-01-1050.

SUMMARY OF INVENTION

Technical Problem

In the in-vehicle heat pump apparatus according to the related art disclosed in NPL 1, however, component elements including the electric compressor, condenser, cooler, condenser pump, and cooler pump are placed without being housed in a casing. For this reason, the heat released from the component elements simply spreads in the in-vehicle heat pump apparatus of the related art.

Furthermore, in the in-vehicle heat pump apparatus of NPL 1, the component elements are placed while being spaced apart from each other. For this reason, the pipes for connecting the component elements cannot be reduced in length in the case of the in-vehicle heat pump apparatus of the related art. Accordingly, a large amount of heat is released from the pipes, and the effective utilization of heat has been difficult in the case of the in-vehicle heat pump apparatus of the related art.

Moreover, in the in-vehicle heat pump apparatus of NPL 1, the component elements are disposed while being spaced apart from each other. For this reason, the component elements are thermally distant from each other, and the heat released from each of the component elements such as the heat released from the electric compressor is simply wasted, and the effective utilization of heat has been difficult.

Moreover, in the refrigerating device of PTL 1, the tube of the water refrigerant heat exchanger is disposed while being spaced from the compressor, so that the heat from the compressor is barely transmitted to the water refrigerant heat exchanger. Moreover, in the refrigerant heat exchanger of PTL 1, the coolant flows through the center of the tube while the refrigerant flows through the outside of the tube. For this reason, heat radiation for the coolant of the water refrigerant heat exchanger from the compressor is barely performed.

An object of the present invention is to provide an in-vehicle heat pump apparatus that enables the effective utilization of heat of the component elements.

Solution to Problem

An in-vehicle heat pump apparatus according to the disclosure includes: an electric compressor that compresses and discharges refrigerant; a high-temperature-side water refrigerant heat exchanger that performs heat exchange between a high-temperature and high-pressure refrigerant discharged from the electric compressor and a first coolant that is an anti-freeze liquid, in which the high-temperature-side water refrigerant heat exchanger surrounds the electric compressor and is in contact with the electric compressor in a heat exchangeable manner.

Advantageous Effects of Invention

According to the present disclosure, a high-temperature-side water refrigerant heat exchanger surrounds an electric compressor and is in contact with the electric compressor in a heat-exchangeable manner, thereby producing the effect of enabling the effective utilization of heat of the component elements.

DESCRIPTION OF EMBODIMENTS

Hereinafter, a description will be given of an embodiment of the present invention with reference to the accompanying drawings. Note that, basically, the same elements are assigned the same reference numerals throughout the entire drawings, and a redundant description will be omitted.

Embodiment 1

Configuration of In-Vehicle Heat Pump Apparatus

Figure 1:
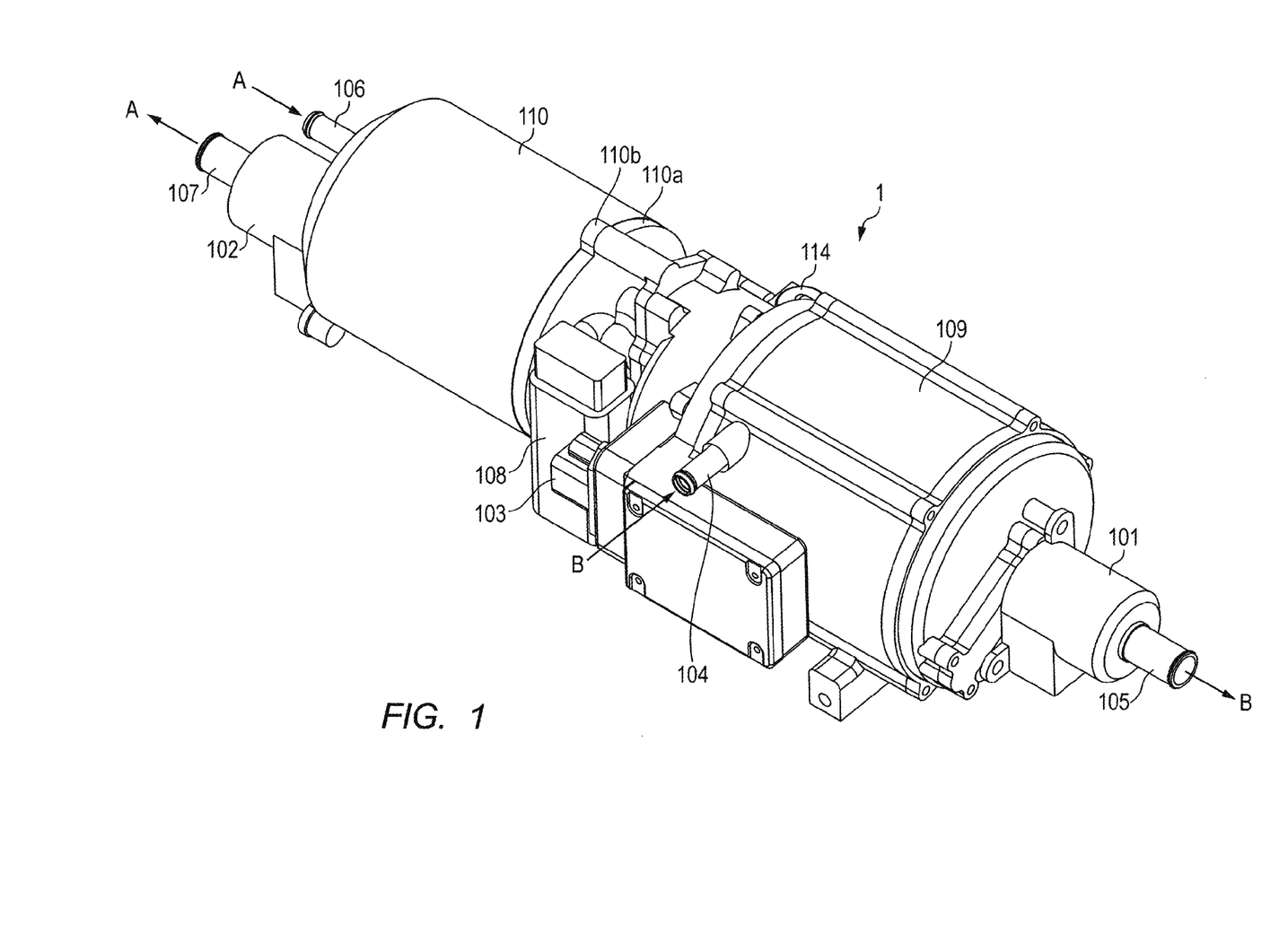
FIG. 1 is a perspective view illustrating an in-vehicle heat pump apparatus according to Embodiment 1 of the present invention.
Figure 2:
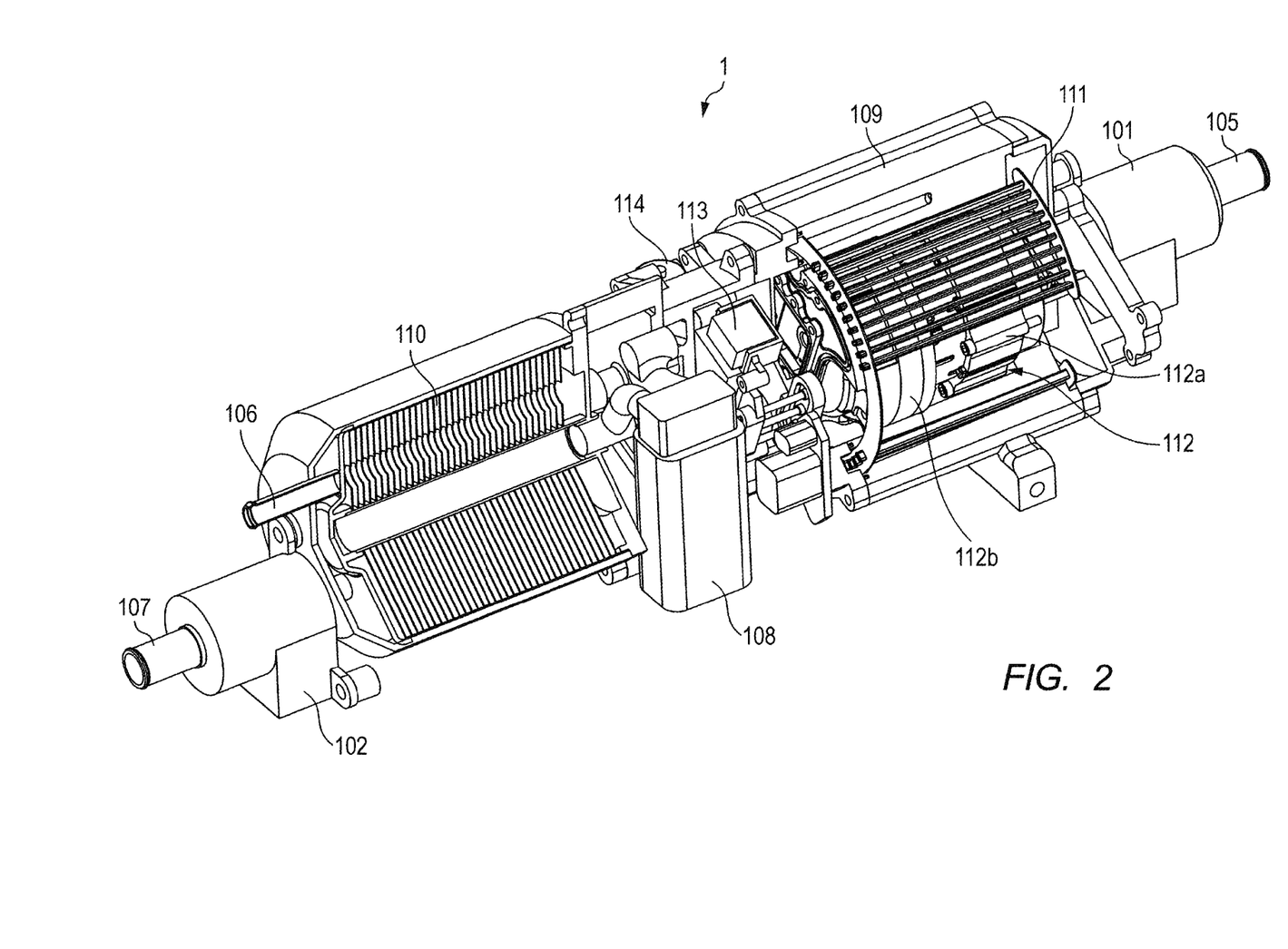
FIG. 2 is a partially broken view illustrating the in-vehicle heat pump apparatus according to Embodiment 1.

Each component in Embodiment 1 of the present invention will be described with reference to FIGS. 1 and 2. FIGS. 1 and 2 are diagrams illustrating a configuration of an in-vehicle heat pump apparatus according to Embodiment 1.

In-vehicle heat pump apparatus 1 is configured to be mounted on a vehicle and includes: low-temperature-side water refrigerant heat exchanger 110; high-temperature-side water refrigerant heat exchanger 111; and electric compressor 112 that compresses refrigerant and discharges the refrigerant. The term "vehicle" herein refers to an electric vehicle, for example. The term "electric vehicle" refers to a vehicle that runs on a storage battery mounted on the vehicle, such as an EV (Electric Vehicle), PHEV (Plug-in Hybrid Electric Vehicle), or HEV (Hybrid Electric Vehicle).

In-vehicle heat pump apparatus 1 includes a heat pump therein and exchanges heat between the refrigerant of the heat pump and the high-temperature-side coolant (corresponding to the first coolant) as well as the low-temperature-side coolant (corresponding to the second coolant). The low-temperature-side coolant and high-temperature-side coolant are introduced from the outside of in-vehicle heat pump apparatus 1.

The refrigerant to be employed herein is one that has a high working pressure and that can improve the efficiency of heat pump cycle even under an extremely low temperature environment required for electric vehicles, such as carbon dioxide ($CO^2$).

The coolant to be employed herein includes a liquid such as an ethylene glycol aqueous solution. As long as an antifreeze solution is used, any solution is acceptable as the coolant. Accordingly, a propylene glycol aqueous solution other than an ethylene glycol aqueous solution can be employed as the coolant.

The high-temperature-side coolant is introduced from the outside of in-vehicle heat pump apparatus 1 via high-temperature-side introduction pipe 104 (arrow B of FIG. 1). The introduced coolant is heated by high-temperature-side water refrigerant heat exchanger 111 and discharged from high-temperature-side discharge pipe 105 (arrow B of FIG. 1). The coolant is transported by the driving force of an electric motor included in high-temperature-side water pump 101.

High-temperature-side water refrigerant heat exchanger 111 includes a passage through which the refrigerant flows and a passage through which the high-temperature-side coolant flows and is configured to move heat between these passages.

The low-temperature-side coolant is introduced from the outside of in-vehicle heat pump apparatus 1 via low-temperature-side introduction pipe 106 (arrow A in FIG. 1). The introduced coolant is cooled by low-temperature-side water refrigerant heat exchanger 110 and discharged from low-temperature-side discharge pipe 107 (arrow A in FIG. 1). The coolant is transported by the driving force of the electric motor included in low-temperature-side water pump 102.

Low-temperature-side water refrigerant heat exchanger 110 includes a passage through which the refrigerant flows and a passage through which the low-temperature-side coolant flows, and is configured to transfer the heat between these passages.

Electric compressor 112 includes electric motor 112a, compression mechanism 112b, and compressor casing (corresponding to first casing) 109, for example. Compression mechanism 112b is a mechanism configured to compress refrigerant by the driving force generated by electric motor 112a. A scroll type compression mechanism can be used for compression mechanism 112b, for example. Electric motor 112a is electrically driven by inverter 113. Inverter 113 includes semiconductors for electric power and generates and supplies three-phase AC power to electric motor 112a.

Compressor casing 109 is used to encapsulate the refrigerant that is processed in electric compressor 112, so as to prevent the refrigerant from leaking to the outside of compressor casing 109. The refrigerant passing through electric compressor 112 flows through the inner side of compressor casing 109.

Electric compressor 112 constitutes a high-pressure shell type compressor. The term "high-pressure shell type compressor" refers to a compressor type having a structure with which the high-pressure refrigerant compressed by compression mechanism 112b flows between electric motor 112a and compressor casing 109 and which allows compressor casing 109 to bear the high-pressure refrigerant. In a low-pressure shell type compressor, the low-temperature and low-pressure refrigerant before compression flows around the electric motor and is thus heated. As a result, the refrigerant introduced into the compression mechanism expands and is diluted. In this case, the density of refrigerant introduced into compression mechanism 112b becomes low, so that the air conditioning performance degrades. Meanwhile, adopting a high-pressure cell type compressor makes it possible to avoid a situation where the refrigerant before compression is heated without discretion and thus to improve the air conditioning performance.

In-vehicle heat pump apparatus 1 includes accumulator 108 on the upstream of an entry for the refrigerant of electric compressor 112. Accumulator 108 serves a role of supplying only the refrigerant gas to electric compressor 112 by separating the refrigerant into the gas and liquid. Accumulator 108 serves this role for the purpose of preventing electric compressor 112 from being broken.

In addition, in-vehicle heat pump apparatus 1 includes expansion valve 114 on the upstream of an entry for the refrigerant of low-temperature-side water refrigerant heat exchanger 110. Expansion valve 114 expands the high-pressure refrigerant on the downstream of the high-temperature-side water refrigerant heat exchanger without causing any change in the amount of heat and decreases the temperature and pressure of the high-pressure refrigerant. The low-temperature and low-pressure refrigerant that has passed through expansion valve 114 is sent to low-temperature-side water refrigerant heat exchanger 110.

In-vehicle heat pump apparatus 1 includes power feeding section 103 used for receiving the electric supplied from the outside of in-vehicle heat pump apparatus 1. Power feeding section 103 is provided on the outer wall of compressor casing 109. The electrical energy supplied to power feeding section 103 is used for driving the electric motors respectively provided to electric compressor 112, high-temperature-side water pump 101, and low-temperature-side water pump 102.

<Control Configuration of In-Vehicle Heat Pump Apparatus>

Figure 3:
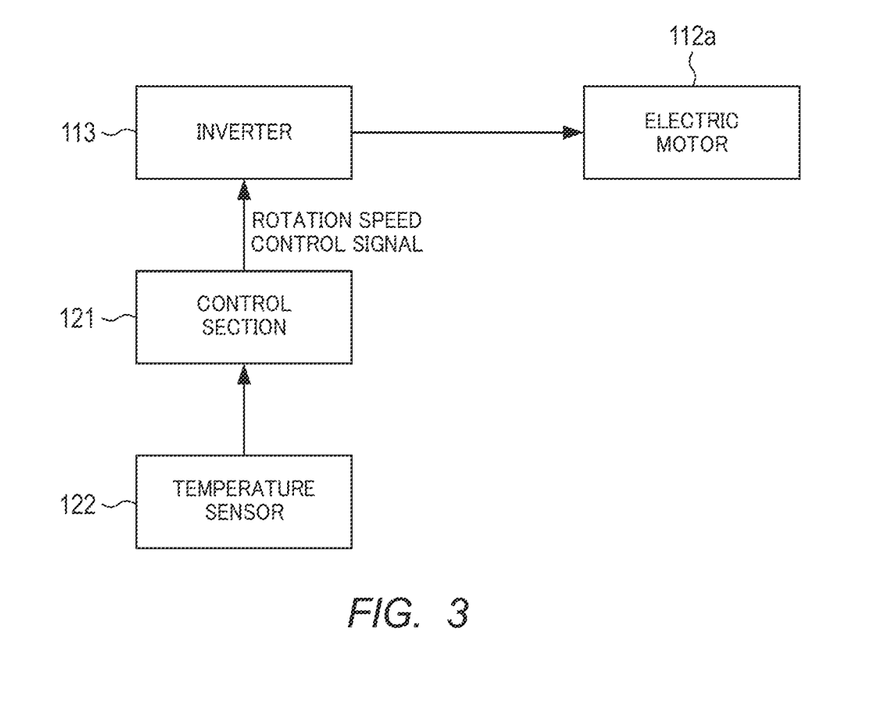
FIG. 3 is a block diagram illustrating a control configuration of the in-vehicle heat pump apparatus according to Embodiment 1.

FIG. 3 is a block diagram illustrating a control configuration of the in-vehicle heat pump apparatus according to Embodiment 1.

In-vehicle heat pump apparatus 1 further includes control section 121, and temperature sensor 122.

Temperature sensor 122 detects a temperature related to a discharge temperature of the refrigerant from electric compressor 112 (see FIG. 4) and outputs the detection signal to control section 121.

Control section 121 controls the rotation of electric motor 112a of electric compressor 112. Control section 121 controls electric motor 112a so as to reduce the rotation speed of electric motor 112a, when the discharge temperature of the refrigerant exceeds a predetermined temperature based on the output of temperature sensor 122. Control section 121 is installed in the circuit casing fixed to the outer wall of compressor casing 109, for example.

<Operation of In-Vehicle Heat Pump Apparatus>

Figure 4:
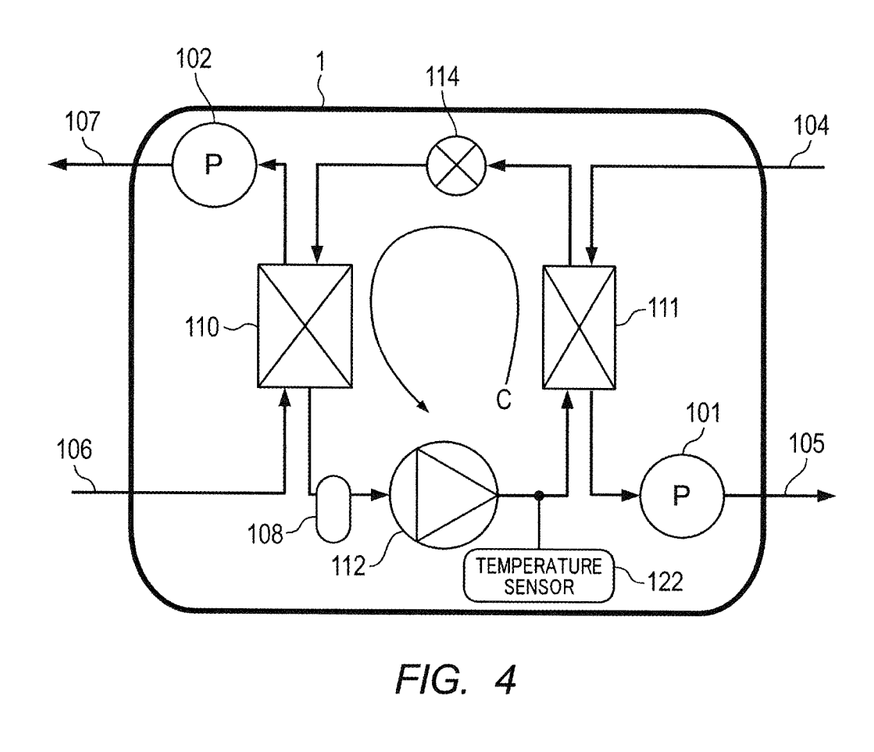
FIG. 4 is a diagram for describing the flow of refrigerant and coolant of the in-vehicle heat pump apparatus according to Embodiment 1.

Next, a description will be given of the flow of refrigerant and coolant of in-vehicle heat pump apparatus 1 with reference to FIG. 4.

To begin with, the flow of refrigerant will be described. Arrow C in FIG. 4 illustrates the direction in which the refrigerant flows. The refrigerant flows in the order of electric compressor 112, high-temperature-side water refrigerant heat exchanger 111, expansion valve 114, and low-temperature-side water refrigerant heat exchanger 110. This flow of the refrigerant forms a heat pump cycle.

The high-temperature and high-pressure refrigerant compressed by electric compressor 112 and discharged therefrom turns into a liquid after release of heat in high-temperature-side water refrigerant heat exchanger 111. The refrigerant that has turned into a liquid drastically expands at expansion valve 114 and becomes a low-temperature and low-pressure refrigerant. This low-temperature and low-pressure refrigerant absorbs heat and evaporates in low-temperature-side water refrigerant heat exchanger 110. The evaporated refrigerant passes through accumulator 108 and is compressed again in electric compressor 112.

Next, the flow of coolant will be described. The coolant introduced from the outside of compressor casing 109 via high-temperature-side introduction pipe 104 is heated by heat exchange with the high temperature refrigerant in high-temperature-side water refrigerant heat exchanger 111. The heated coolant is discharged from high-temperature-side discharge pipe 105.

The coolant introduced from the outside of in-vehicle heat pump apparatus 1 via low-temperature-side introduction pipe 106 is cooled by heat exchange with the low-temperature refrigerant in low-temperature-side water refrigerant heat exchanger 110 and discharged from low-temperature-side discharge pipe 107.

As described above, in-vehicle heat pump apparatus 1 of Embodiment 1 achieves a heat pump cycle by circulating the refrigerant within the apparatus. Furthermore, high-temperature-side water refrigerant heat exchanger 111 and low-temperature-side water refrigerant heat exchanger 110 exchanges heat between the liquid and refrigerant (coolant) rather than air. With this configuration, in-vehicle heat pump apparatus 1 can absorb heat from a place distant from in-vehicle heat pump apparatus 1 via the coolant and release heat to a place distant from in-vehicle heat pump apparatus 1.

<Vehicle Temperature Adjustment System>

Figure 5:
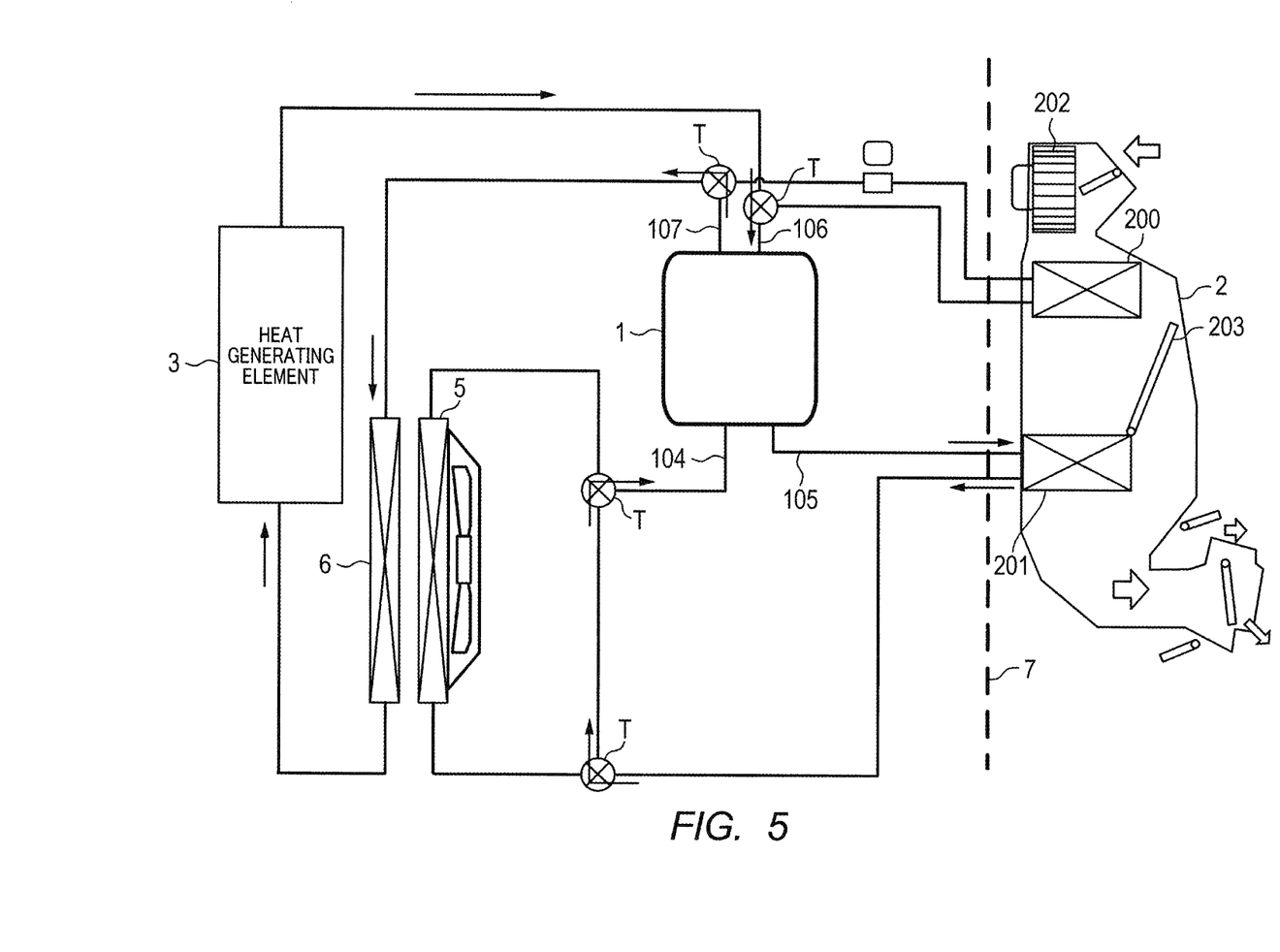
FIG. 5 is a diagram for describing a vehicle temperature adjustment system using a vehicle heat pump apparatus.
Figure 6:
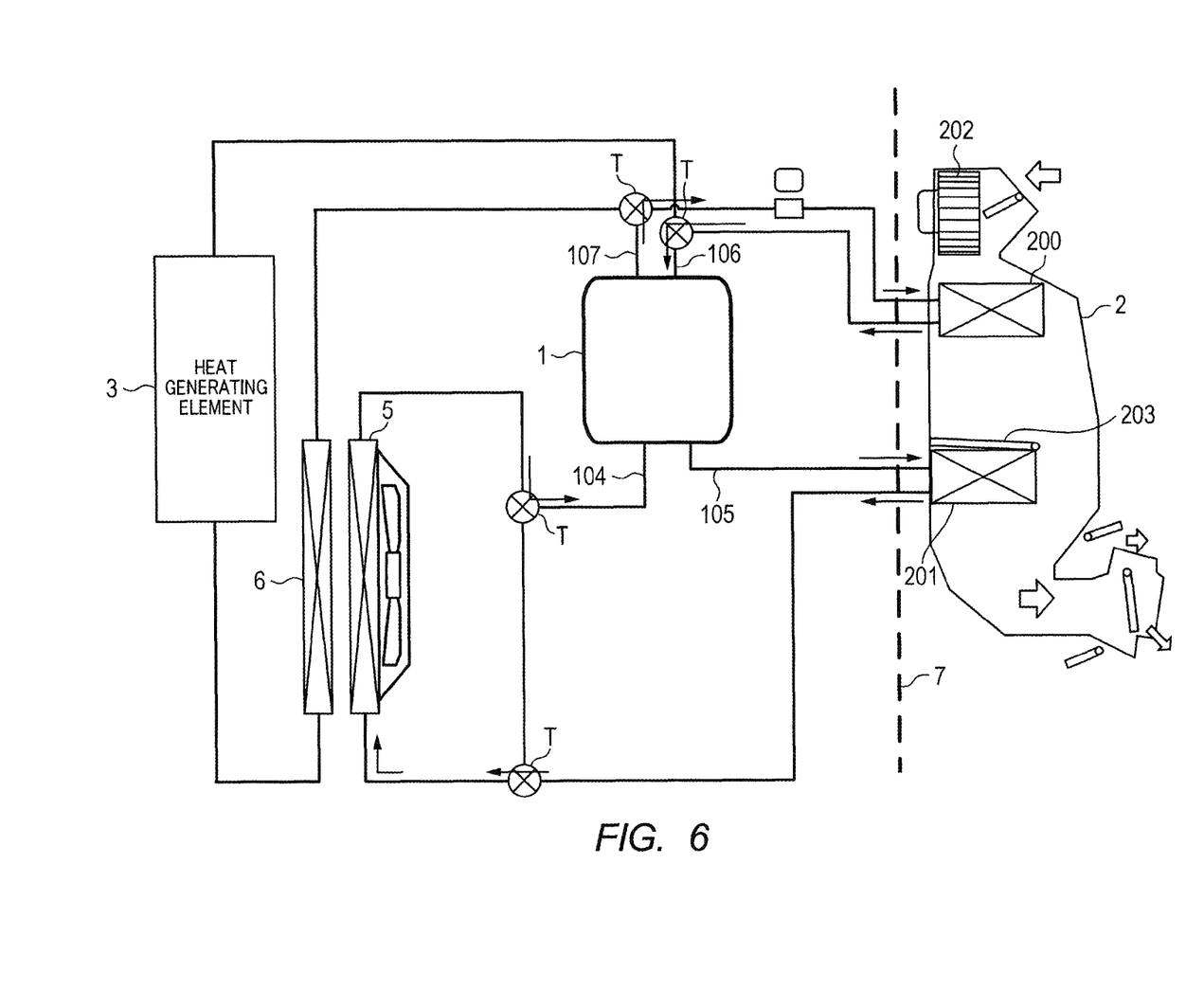
FIG. 6 is another diagram for describing the vehicle temperature adjustment system using the vehicle heat pump apparatus.

Next, a description will be given of a vehicle temperature adjustment system using in-vehicle heat pump apparatus 1 with reference to FIGS. 5 and 6. FIG. 5 is an explanatory diagram of the vehicle temperature adjustment system during the heating operation, and FIG. 6 is an explanatory diagram of the vehicle temperature adjustment system during the cooling operation.

The heated coolant discharged from high-temperature-side discharge pipe 105 and the cooled coolant discharged from low-temperature-side discharge pipe 107 are introduced into in-vehicle air conditioning apparatus 2 and are used for cooling or heating. In-vehicle air conditioning apparatus 2 is an apparatus that is placed on the vehicle interior side of fire wall 7 and that performs air conditioning of the vehicle interior. In-vehicle heat pump apparatus 1 is placed on the outer side of the vehicle interior of fire wall 7.

In-vehicle air conditioning apparatus 2 includes cooling air refrigerant heat exchanger 200, heating air refrigerant heat exchanger 201, blower fan 202, and switching door 203.

Cooling air refrigerant heat exchanger 200 exchanges heat between the air blown by blower fan 202 and the cooled coolant discharged from low-temperature-side discharge pipe 107, thereby cooling the air. The cooled air is introduced into the vehicle interior and used for cooling the vehicle interior.

The coolant heated by cooling air refrigerant heat exchanger 200 is introduced into in-vehicle heat pump apparatus 1 again via low-temperature-side introduction pipe 106.

Heating air refrigerant heat exchanger 201 is configured to exchange heat between the air blown by blower fan 202 and the heated coolant discharged from high-temperature-side discharge pipe 105, thereby heating the air. The heated air is introduced into the vehicle interior and used for heating the vehicle interior.

The coolant cooled by heating air refrigerant heat exchanger 201 is introduced into in-vehicle heat pump apparatus 1 again via high-temperature-side introduction pipe 104. Note that, first radiator 5 is used in heat radiation of coolant during cooling.

The coolant discharged from in-vehicle heat pump apparatus 1 can be used for cooling heat generating element 3. Heat generating element 3 is a heat generating member such as a running motor used in electric vehicles, an inverter for driving a running motor, a storage battery for supplying electric energy to a running motor, a charger for charging a storage battery from the outside of a vehicle, or a DC-DC converter for voltage conversion of a storage battery. These heat generating members need to be cooled while the electric vehicle runs, for example.

The heat released from heat generating element 3 is absorbed by the coolant. More specifically, the coolant is heated. This heated coolant is introduced into low-temperature-side introduction pipe 106 and cooled by in-vehicle heat pump apparatus 1. This heated coolant can be cooled by causing heat radiation of the coolant in second radiator 6.

When in-vehicle air conditioning apparatus 2 is used in heating of the vehicle interior, the heat released from heat generating element 3 is absorbed by the coolant. More specifically, the coolant is heated. This heated coolant is introduced into low-temperature-side introduction pipe 106 and cooled by low-temperature-side water refrigerant heat exchanger 110.

In this case, the heat recycled (absorbed) by the refrigerant can be used for heating the air in the vehicle interior by causing the high-temperature-side coolant to recycle (absorb) the heat in high-temperature-side water refrigerant heat exchanger 111, extracting this coolant from high-temperature-side discharge pipe 105 and introducing this coolant into heating air refrigerant heat exchanger 201.

As illustrated in FIGS. 5 and 6, the vehicle temperature adjustment system can switch between heating and cooling of the vehicle interior, for example, by switching between the passages of the coolant via a plurality of three-way valves T as well as switching between the air passages toward the vehicle interior via switching door 203.

<Details of High-Temperature-Side Water Refrigerant Heat Exchanger>

Next, a detailed description will be given of the configuration of compressor casing 109 side in in-vehicle heat pump apparatus 1 of Embodiment 1.

Figure 7:
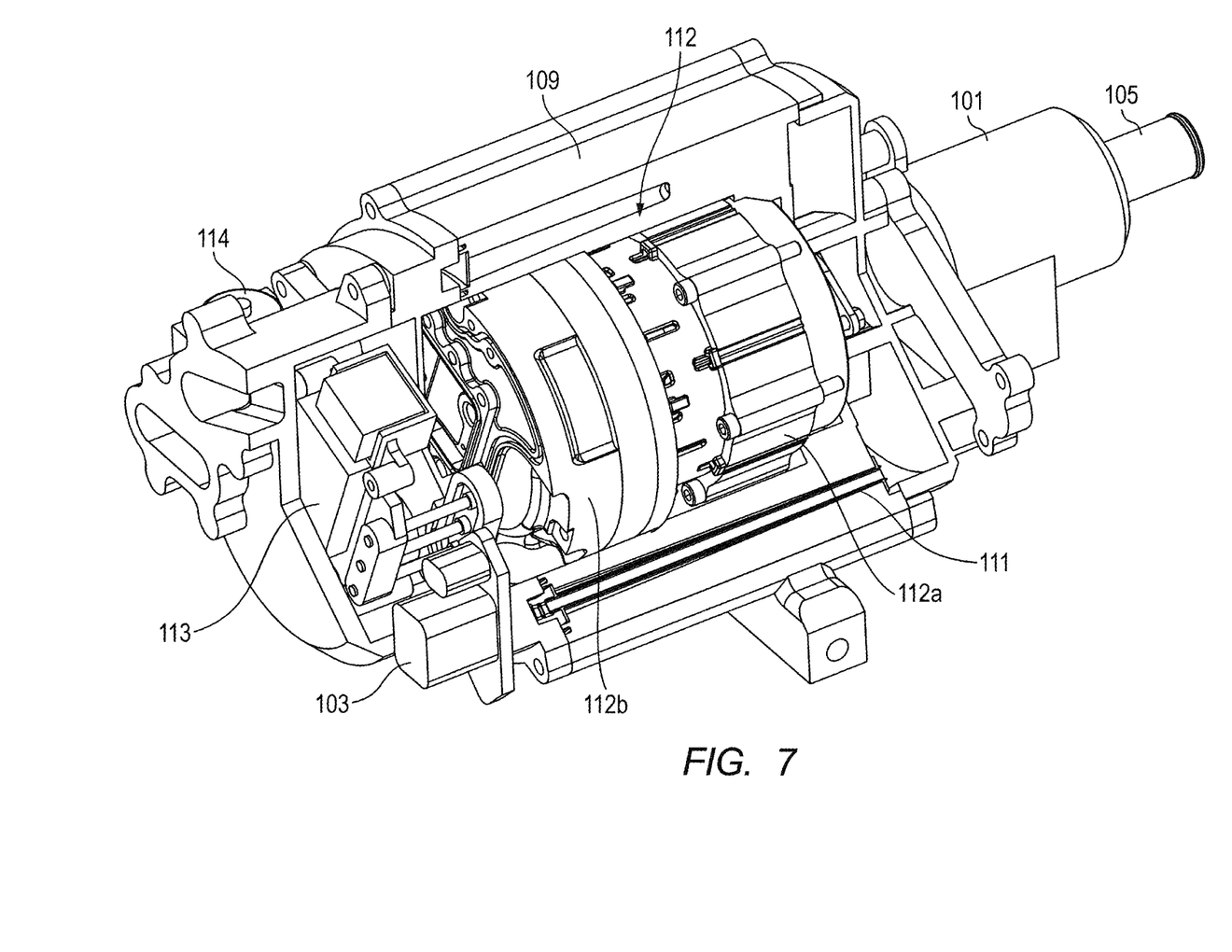
FIG. 7 is a partially broken perspective view illustrating a configuration of a casing side of a compressor of Embodiment 1.
Figure 8:
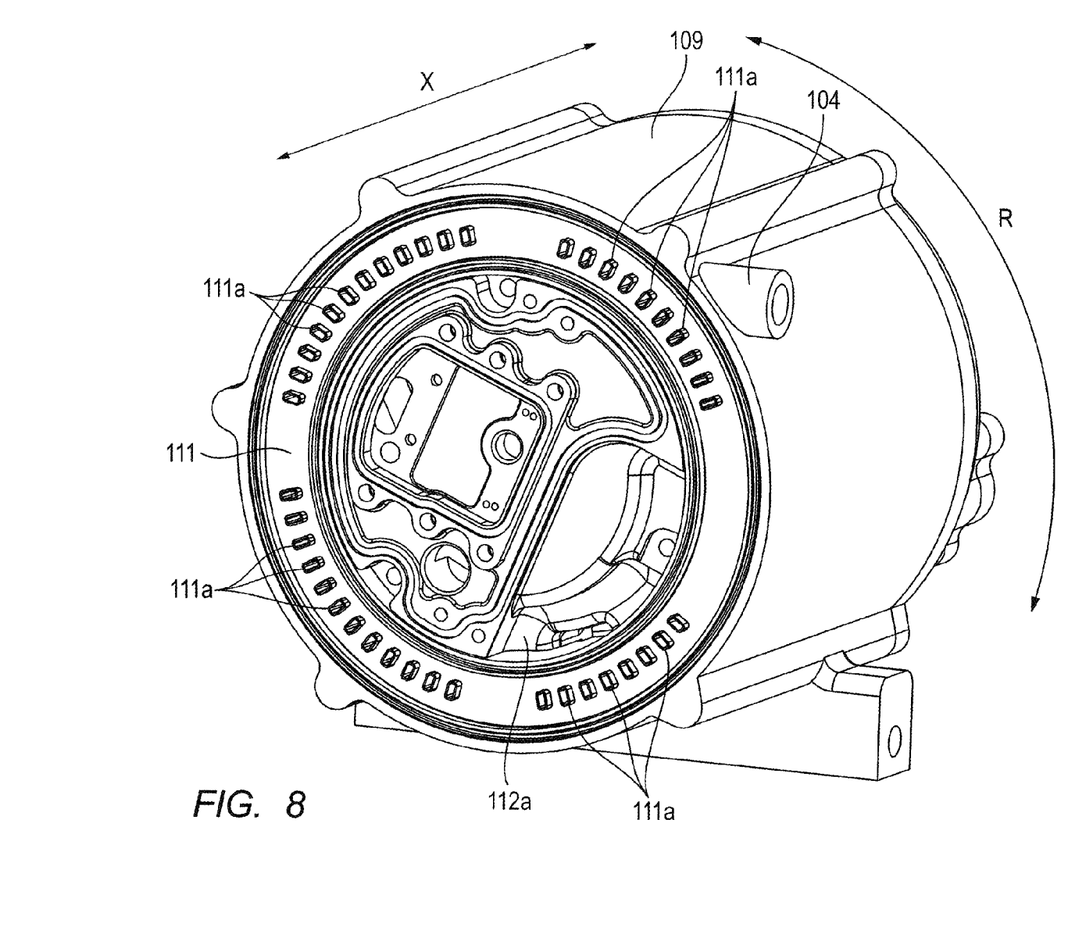
FIG. 8 is another partially broken perspective view illustrating the configuration of the casing side of the compressor of Embodiment 1.
Figure 9:
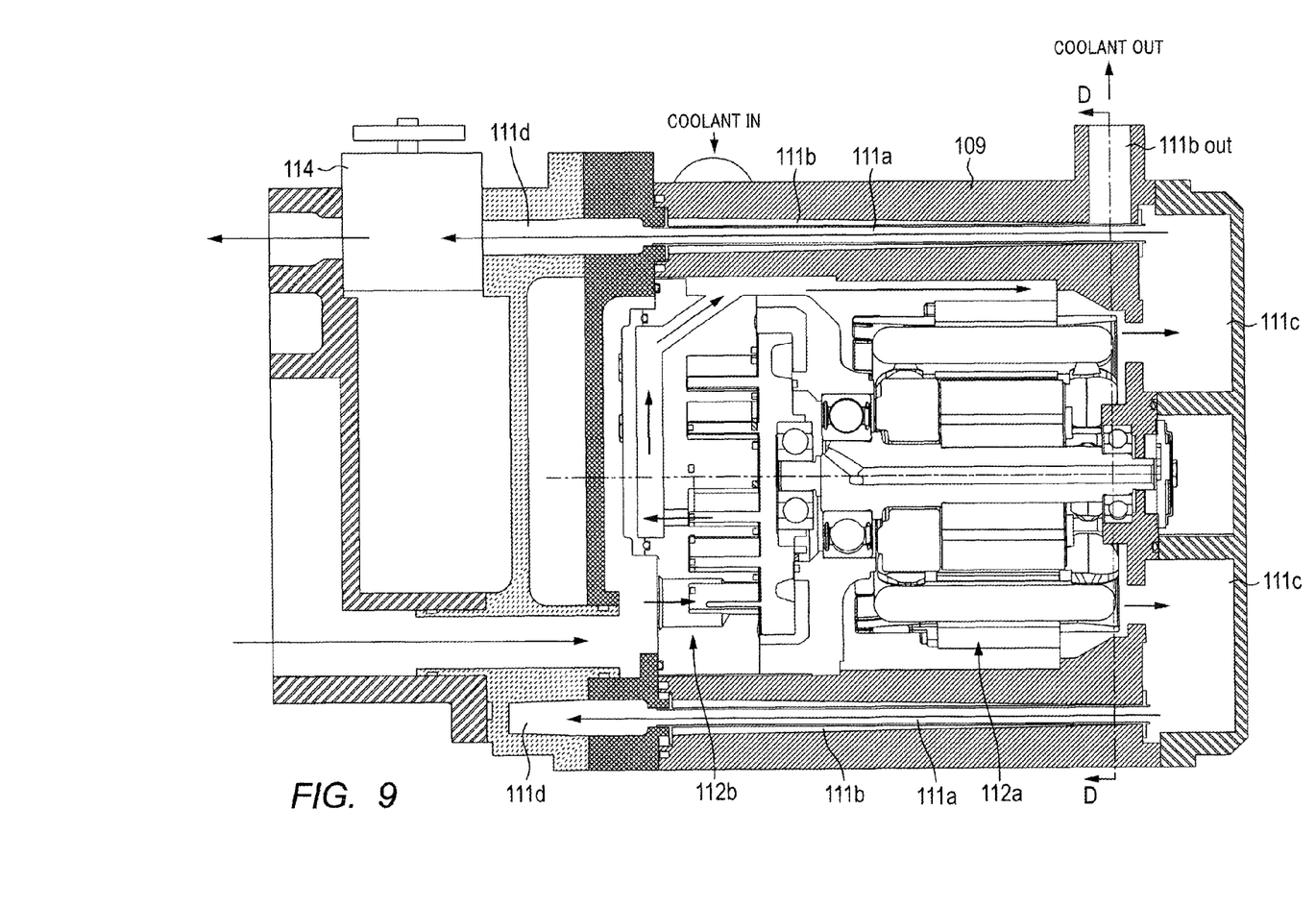
FIG. 9 is a cross-sectional view illustrating the configuration of the casing side of the compressor of Embodiment 1.
Figure 10:
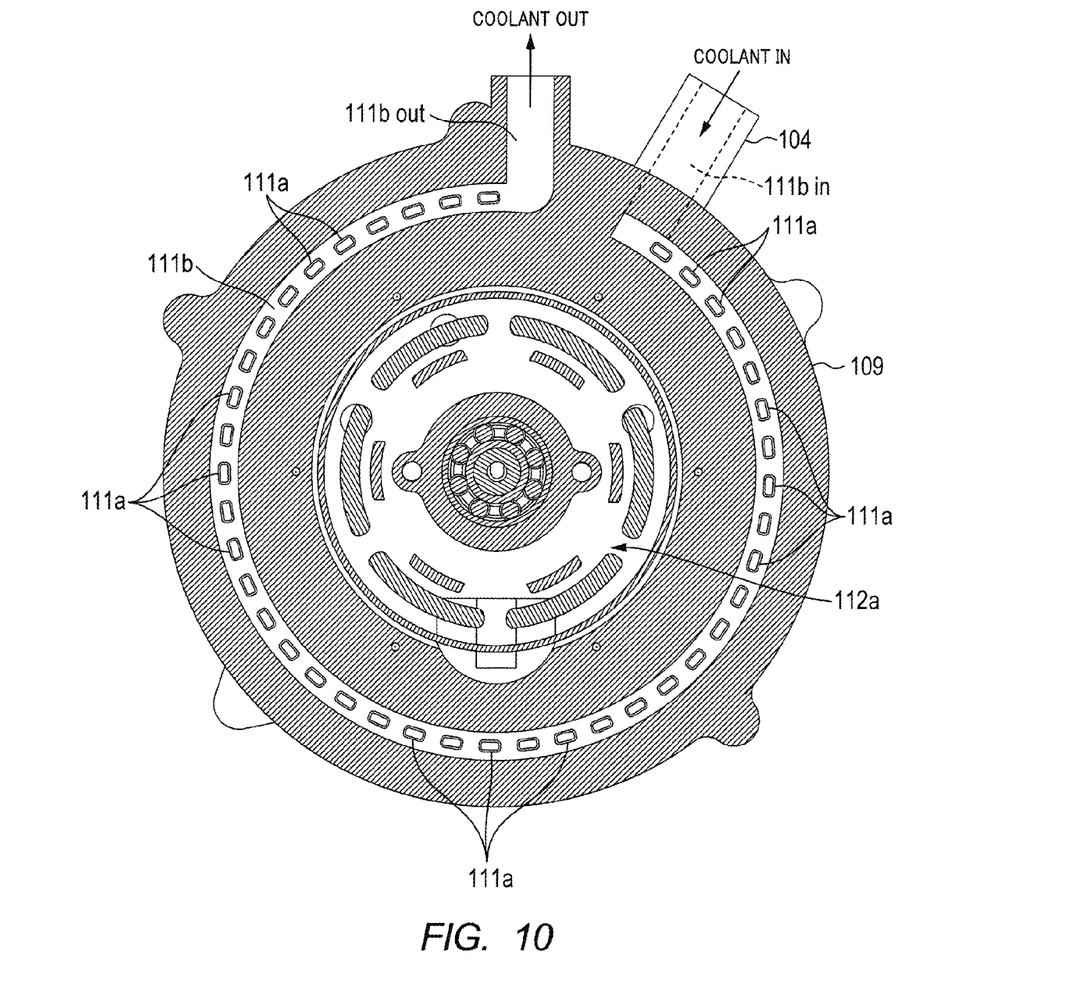
FIG. 10 is a cross-sectional view taken along the line D-D of FIG. 9.

FIGS. 7 and 8 are each a partially broken perspective view illustrating the configuration on the side of compressor casing of Embodiment 1. FIG. 9 is a cross sectional view illustrating the configuration on the side of compressor casing of Embodiment 1. FIG. 10 is a cross sectional view taken along the line D-D of FIG. 9.

High-temperature-side water refrigerant heat exchanger 111 is provided in the wall of compressor casing 109.

As illustrated in FIGS. 8 to 10, high-temperature-side water refrigerant heat exchanger 111 includes passages 111*a* through which the refrigerant flows, and passage 111*b* through which the coolant flows.

Passage 111*b* for coolant is formed by a space extending in a two dimensional direction (X-R direction of FIG. 8) along the circumference of electric compressor 112 and is provided with introduction port 111*b* in for coolant and outlet port 111*b* out for coolant at one end and the other end of passage 111*b*, respectively. Outlet port 111*b* out communicates with high-temperature-side water pump 101. In addition, passage 111*b* is partially formed by the wall of compressor casing 109.

Passages 111*a* for refrigerant are formed of a plurality of linear and cylindrical pipes, for example, and placed in the space surrounding passage 111*b* for coolant so as to cross passage 111*b* for coolant. As illustrated in FIG. 10, a plurality of passages 111*a* are placed in the circumferential direction of electric compressor 112 (in direction R in FIG. 8) in a distributed manner. As illustrated in FIG. 9, one end of each passage 111*a* communicates with refrigerant chamber 111*c* in communication with a refrigerant discharge port of electric compressor 112, while the other end of each passage 111*a* communicates with refrigerant chamber 111*d* in communication with expansion valve 114. Refrigerant chambers 111*c* and 111*d* are formed by the wall of compressor casing 109.

With this configuration, the high-temperature and high-pressure refrigerant that has been compressed by electric compressor 112 is discharged to refrigerant chamber 111*c* from electric compressor 112 and proceeds to a plurality of passages 111*a* of high-temperature-side water refrigerant heat exchanger 111. This high-temperature and high-pressure refrigerant thereafter is condensed by heat radiation to the coolant in high-temperature-side water refrigerant heat exchanger 111 and is sent to expansion valve 114 via refrigerant chamber 111*d*.

As illustrated in FIGS. 7 to 10, high-temperature-side water refrigerant heat exchanger 111 and electric compressor 112 are configured integrally by using single compressor casing 109 as a common casing for the two devices.

Compressor casing 109 is sealable and encapsulates high-temperature-side water refrigerant heat exchanger 111 by the wall except for each introduction port and each discharge port for the coolant and refrigerant and also encapsulates electric motor 112*a* and compression mechanism 112*b* within the housing space of compressor casing 109.

Compressor casing 109 may be regarded as separate casings for high-temperature-side water refrigerant heat exchanger 111 and electric compressor 112 by dividing the wall of compressor casing 109 into two parts and using the outer circumferential part for high-temperature-side water refrigerant heat exchanger 111 and the inner circumferential part for electric compressor 112. In this case, as illustrated in FIGS. 7 to 10, high-temperature-side water refrigerant heat exchanger 111 can be regarded as surrounding the circumference of electric compressor 112 and being in contact with electric compressor 112 in a heat exchangeable manner.

Note that, it is actually possible to employ a configuration in which high-temperature-side water refrigerant heat exchanger 111 and electric compressor 112 are formed in separate casings, and high-temperature-side water refrigerant heat exchanger 111 surrounds the circumference of electric compressor 112 and is in contact with electric compressor 112 in a heat exchangeable manner.

<Effects of Embodiment 1>

According to in-vehicle heat pump apparatus 1 of Embodiment 1, the heat generated in electric compressor 112 is released into high-temperature-side water refrigerant heat exchanger 111 and mainly heats the coolant. Thus, the exhaust heat of electric compressor 112 can be effectively used. In addition, electric compressor 112 can be appropriately cooled.

In addition, according to in-vehicle heat pump apparatus 1 of Embodiment 1, electric motor 112*a*, compression mechanism 112*b*, and passages 111*a* and 111*b* of high-temperature-side water refrigerant heat exchanger 111 are housed and encapsulated in electric compressor casing 109. Accordingly, the casing for electric compressor 112 and the casing for high-temperature-side water refrigerant heat exchanger 111 can be made common as a casing having a high strength for encapsulating a high-pressure refrigerant to prevent leakage of the high-pressure refrigerant to the outside. Thus, the number of components of in-vehicle heat pump apparatus 1 can be reduced, and the configuration of in-vehicle heat pump apparatus 1 can be made compact.

<Details of Placement of Component Elements>

Next, a description will be given of the placement of component elements of in-vehicle heat pump apparatus 1 of Embodiment 1.

Low-temperature-side water refrigerant heat exchanger 110, accumulator 108, and high-temperature-side water refrigerant heat exchanger 111 are placed adjacent to each other in the order named. In addition, low-temperature-side water refrigerant heat exchanger 110, expansion valve 114, and high-temperature-side water refrigerant heat exchanger 111 are placed adjacent to each other in the order named. The term "placed adjacent to each other in the order" refers to a placement in which accumulator 108 or expansion valve 114 exists within a space formed by a projection plane formed when low-temperature-side water refrigerant heat exchanger 110 is projected toward high-temperature-side water refrigerant heat exchanger 111. As long as accumulator 108 or expansion valve 114 exists within a space formed by the projection plane, this term is applicable. The term "placed adjacent to each other in the order" is applicable to a placement in which accumulator 108 or valve 114 partially exists outside this space.

Figure 11:
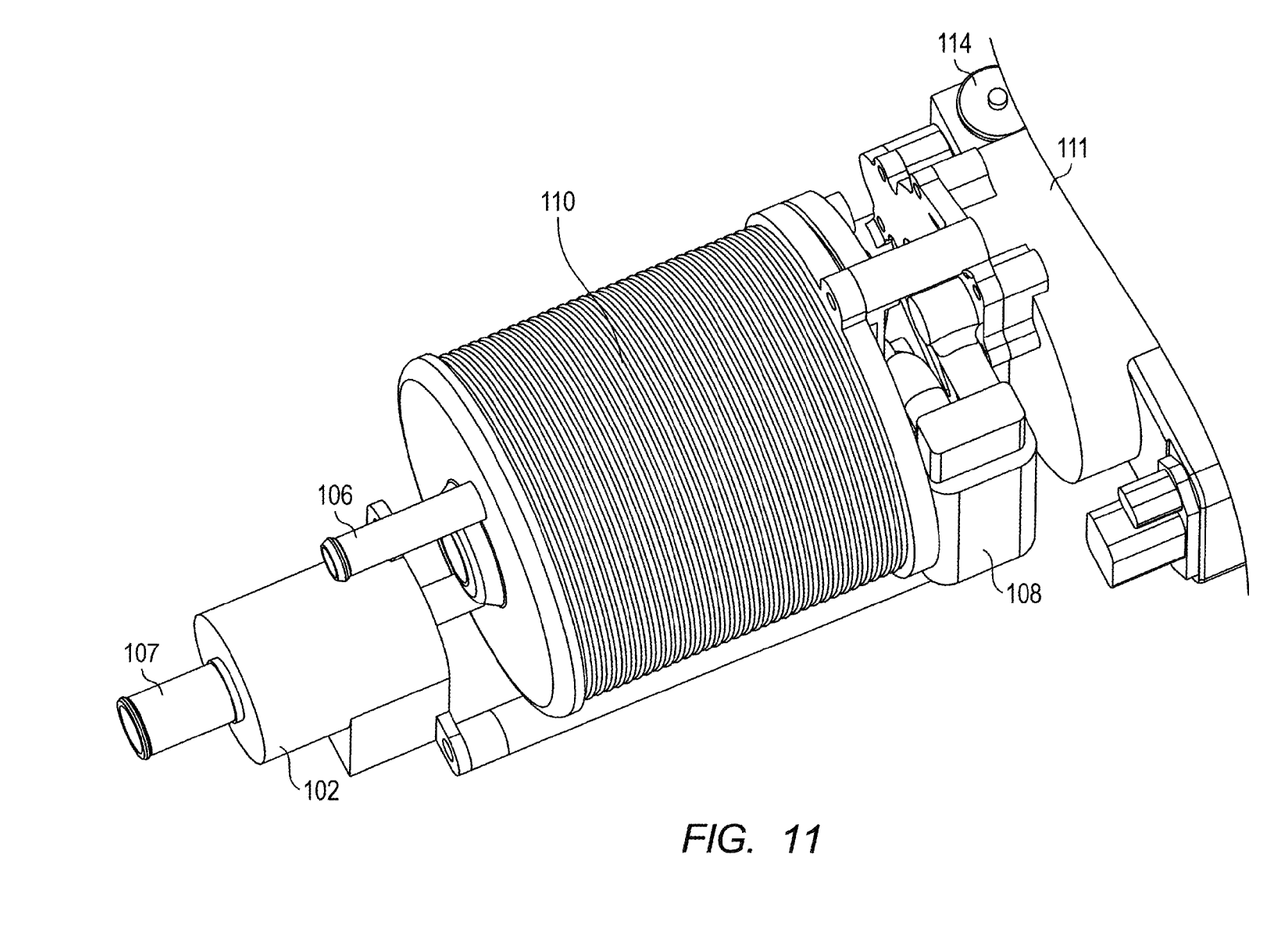
FIG. 11 is a perspective view illustrating a variation of how an accumulator is placed.

FIG. 11 is a perspective view illustrating a variation of the placement of accumulator 108. As illustrated in FIG. 11, accumulator 108 small in size can be placed between low-temperature-side water refrigerant heat exchanger 110 and high-temperature-side water refrigerant heat exchanger 111.

Low-temperature-side water refrigerant heat exchanger 110, accumulator 108, and high-temperature-side water refrigerant heat exchanger 111 are placed linearly in the order named. In addition, low-temperature-side water refrigerant heat exchanger 110, expansion valve 114, and high-temperature-side water refrigerant heat exchanger 111 are placed linearly in the order named.

The placement described above enables a configuration having a shorter passage for refrigerant in in-vehicle heat pump apparatus 1 of Embodiment 1. Furthermore, the reduction in the length of passage for refrigerant can reduce the amount of refrigerant and also can reduce a pressure loss in the flow of refrigerant, and can also reduce a heat loss from the pipes for refrigerant.

<Structure to Fasten Compressor Casing and Low-Temperature-Side Water Refrigerant Heat Exchanger>

Low-temperature-side water refrigerant heat exchanger 110 is held by casing (corresponding to second casing) 110a with a high strength for encapsulating a high pressure refrigerant (see FIGS. 1 and 2). Note that, it is also possible to employ a configuration in which low-temperature-side water refrigerant heat exchanger 110 is held by a frame body instead of casing 110a. Casing 110a is fastened to compressor casing 109 via fastening portion 110b.

With this configuration, the three component elements including low-temperature-side water refrigerant heat exchanger 110, high-temperature-side water refrigerant heat exchanger 111, and electric compressor 112 can be put into a highly-rigid integrated configuration. This configuration can enhance the strength of the pipes for refrigerant between low-temperature-side water refrigerant heat exchanger 110 and compressor casing 109. According to in-vehicle heat pump apparatus 1 of Embodiment 1, it is possible to easily achieve, with low costs, a configuration having a high strength for refrigerant having a high operation pressure.

Embodiment 2

Figure 12:
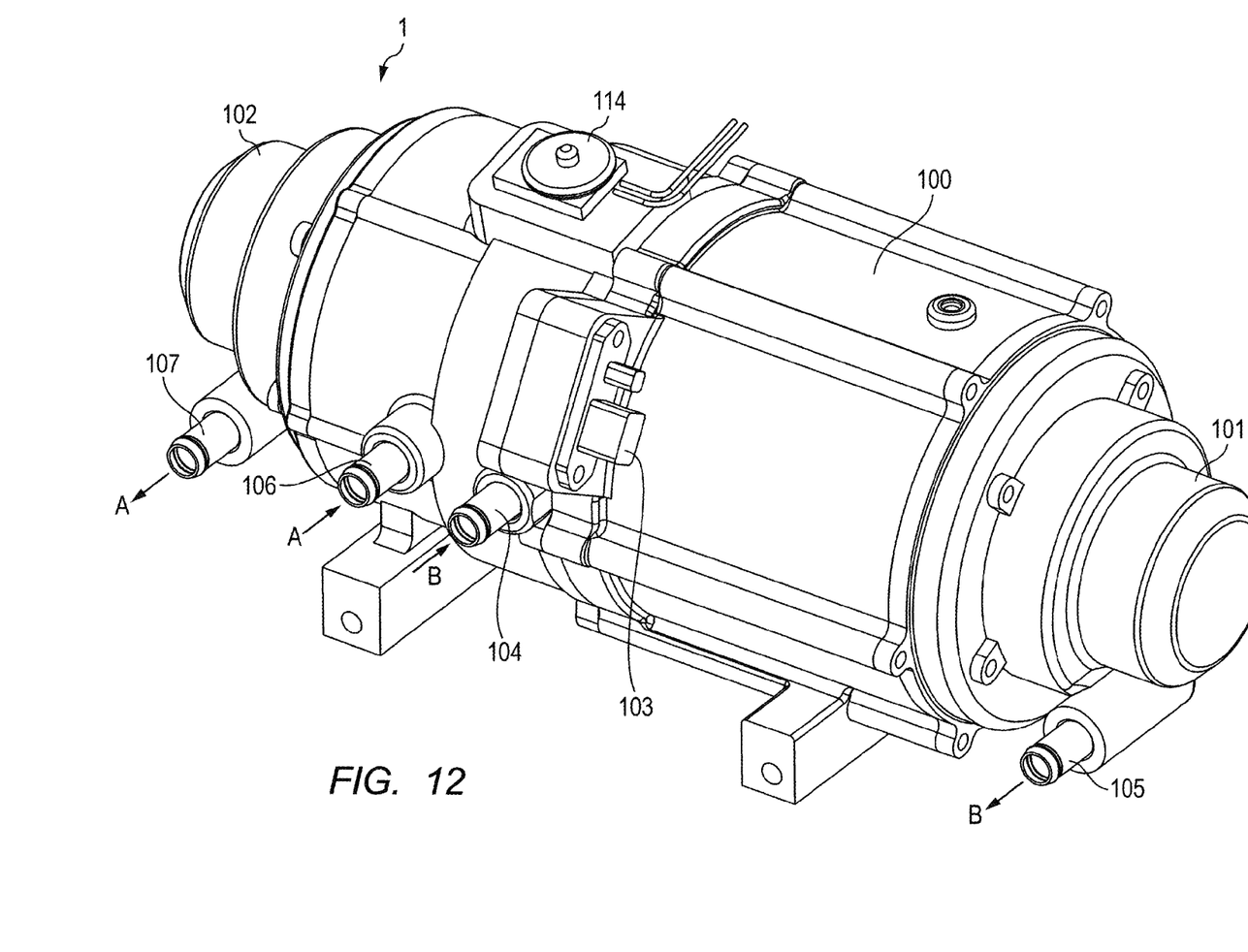
FIG. 12 is a perspective view illustrating an in-vehicle heat pump apparatus according to Embodiment 2 of the present invention.

FIG. 12 is a perspective view illustrating an in-vehicle heat pump apparatus according to Embodiment 2.

In-vehicle heat pump apparatus 1 of Embodiment 2 is configured to integrally house low-temperature-side water refrigerant heat exchanger 110, high-temperature-side water refrigerant heat exchanger 111, and electric compressor 112 in casing 100.

Casing 100 is sealable. Low-temperature-side water refrigerant heat exchanger 110, high-temperature-side water refrigerant heat exchanger 111, and electric compressor 112 are placed in casing 100 in the same way as that of Embodiment 1.

Accumulator 108 is placed between low-temperature-side water refrigerant heat exchanger 110 and high-temperature-side water refrigerant heat exchanger 111 in casing 100.

Note that, high-temperature-side water refrigerant heat exchanger 111 may be provided in the wall of casing 100 in the case of in-vehicle heat pump apparatus 1 of Embodiment 2. Moreover, casing 100 may be configured to serve as a casing for electric compressor 112 (shell that encapsulates refrigerant).

<Effects of Embodiment 2>

According to in-vehicle heat pump apparatus 1 of Embodiment 2, housing the component elements in casing 100 having sealability brings about the effect that the heat released from the component elements can be effectively utilized without being spread. In addition, placing the component elements adjacent to each other makes it possible to reduce the length of passages for connecting the component elements. Accordingly, the released amount of heat from the passages is reduced, and the effect that the heat of the component elements can be effectively utilized is brought about.

Furthermore, according to in-vehicle heat pump apparatus 1 of Embodiment 2, placing the component elements adjacent to each other makes it possible to reduce the length of passages for connecting the component elements, and the number of connection portions for connecting the passages for refrigerant is reduced. This brings about the effects that leakage of the refrigerant from the connection portions can be reduced, and that the number of assembly steps can be reduced. In addition, reducing the number of connection portions brings about the effect that use of a high-pressure refrigerant such as carbon dioxide refrigerant can be made easier.

Each embodiment of the present invention has been described thus far.

Note that, in the embodiments described above, the configuration using carbon dioxide as the refrigerant has been described as an example, but other various refrigerants may be used. In addition, the high-temperature-side water refrigerant heat exchanger and low-temperature-side water refrigerant heat exchanger are by no means limited to the illustrated specific configuration.

In addition, in the embodiments described above, a description has been given of the case where the low-temperature-side coolant and high-temperature-side coolant are not mixed even outside in-vehicle heat pump apparatus 1. However, depending on the system configuration, it is possible to employ a configuration in which the passage for low-temperature-side coolant and the passage for high-temperature-side coolant are joined together and integrated into a single passage outside in-vehicle heat pump apparatus 1.

Moreover, in the embodiments described above, a description has been given of the configuration in which the coolant pump is included in the in-vehicle heat pump apparatus as an example. However, the coolant pump can be provided to the vehicle temperature adjustment system and omit the coolant pump from the in-vehicle heat pump apparatus.

The disclosures of the specifications, drawings, and abstracts in Japanese Patent Application No. 2012-147613 filed on Jun. 29, 2012 and Japanese Patent Application No. 2012-179285 filed on Aug. 13, 2012 are incorporated herein by reference in their entireties.

INDUSTRIAL APPLICABILITY

The in-vehicle heat pump apparatus according to the present invention is suitable for use in a system that adjusts a temperature of each component within a vehicle, for example.

REFERENCE SIGNS LIST

1 In-vehicle heat pump apparatus
100 Casing

101 High-temperature-side water pump
102 Low-temperature-side water pump
103 Power feeding section
104 High-temperature-side introduction pipe
105 High-temperature-side discharge pipe
106 Low-temperature-side introduction pipe
107 Low-temperature-side discharge pipe
108 Accumulator
109 Compressor Casing
110 Low-temperature-side water refrigerant heat exchanger
111 High-temperature-side water refrigerant heat exchanger
111a Passage for refrigerant
111b Passage for coolant
112 Electric compressor
112a Electric motor
112b Compression mechanism
113 Inverter
114 Expansion valve
2 In-vehicle air conditioning apparatus
200 Cooling air refrigerant heat exchanger
201 Heating air refrigerant heat exchanger
202 Blower fan
3 Heat generating element
5 First radiator
6 Second radiator
7 Fire wall

The invention claimed is:

1. An in-vehicle heat pump apparatus comprising:
an electric compressor that compresses and discharges refrigerant;
a first casing that is a casing for the electric compressor;
a high-temperature-side water refrigerant heat exchanger that performs heat exchange between a high-temperature and high-pressure refrigerant discharged from the electric compressor and a first coolant introduced from an outside of the in-vehicle heat pump apparatus;
a low-temperature-side water refrigerant heat exchanger that cools a second coolant introduced from an outside of the in-vehicle heat pump apparatus, using a low-temperature and low-pressure refrigerant;
a second casing that is fastened to the first casing and holds the low-temperature-side water refrigerant heat exchanger, wherein
the high-temperature-side water refrigerant heat exchanger is provided in the first casing and surrounds a circumference of the electric compressor and is in contact with the electric compressor in a heat exchangeable manner.

2. The in-vehicle heat pump apparatus according to claim 1, wherein a passage for the first coolant and a passage for the high-temperature and high-pressure refrigerant discharged from the electric compressor are formed in a wall of the first casing, and these passages compose the high-temperature-side water refrigerant heat exchanger.

3. The in-vehicle heat pump apparatus according to claim 2, wherein the passage for the high-temperature and high-pressure refrigerant discharged from the electric compressor is placed in the passage for the first coolant.

4. The in-vehicle heat pump apparatus according to claim 1, further comprising:
an accumulator that separates a gas-phase refrigerant and a liquid-phase refrigerant from each other, wherein:
the low-temperature-side water refrigerant heat exchanger, the accumulator, and the electric compressor are placed adjacent to each other in the order named.

5. The in-vehicle heat pump apparatus according to claim 1, further comprising:
an expansion valve that expands refrigerant on a downstream side of the high-temperature-side water refrigerant heat exchanger, wherein:
the electric compressor, the expansion valve, and the low-temperature-side water refrigerant heat exchanger are placed adjacent to each other in the order named.

6. The in-vehicle heat pump apparatus according to claim 1,
wherein
the electric compressor, the low-temperature-side water refrigerant heat exchanger, and the high-temperature-side water refrigerant heat exchanger are integrally housed in a single casing comprising the first casing and the second casing.

7. The in-vehicle heat pump apparatus according to claim 1, wherein the electric compressor is a high-pressure-shell type compressor.

8. The in-vehicle heat pump apparatus according to claim 1, wherein the refrigerant is carbon dioxide.

9. The in-vehicle heat pump apparatus according to claim 1, wherein the first coolant is an ethylene glycol aqueous solution or a propylene glycol aqueous solution.

10. The in-vehicle heat pump apparatus according to claim 1, further comprising:
a temperature measurement section that measures a temperature of the high-pressure and high-temperature refrigerant discharged from the electric compressor; and
a control section that controls a rotation speed of an electric motor included in the electric compressor, wherein
the control section decreases the rotation speed of the electric motor included in the electric compressor, when the temperature of the refrigerant measured by the temperature measurement section is equal to or greater than a predetermined temperature.

* * * * *